United States Patent
Hu et al.

(10) Patent No.: US 9,820,277 B2
(45) Date of Patent: Nov. 14, 2017

(54) METHOD AND DEVICE TO ASSOCIATE AT LEAST ONE TELECOMMUNICATION USER EQUIPMENT TO COMPONENT CARRIERS

(71) Applicant: Orange, Paris (FR)

(72) Inventors: Lijie Hu, Beijing (CN); Kan Zheng, Beijing (CN); Lin Huang, Beijing (CN)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/431,591

(22) PCT Filed: Sep. 27, 2013

(86) PCT No.: PCT/IB2013/002530
§ 371 (c)(1),
(2) Date: Mar. 26, 2015

(87) PCT Pub. No.: WO2014/083396
PCT Pub. Date: Jun. 5, 2014

(65) Prior Publication Data
US 2015/0257154 A1    Sep. 10, 2015

(30) Foreign Application Priority Data

Sep. 27, 2012   (WO) ................ PCT/CN2012/082171

(51) Int. Cl.
*H04W 72/04*   (2009.01)
*H04L 5/00*    (2006.01)
(Continued)

(52) U.S. Cl.
CPC ...... *H04W 72/0453* (2013.01); *H04B 17/336* (2015.01); *H04L 5/001* (2013.01);
(Continued)

(58) Field of Classification Search
CPC ................................................ H04W 72/0453
See application file for complete search history.

(56) References Cited

U.S. PATENT DOCUMENTS 8,320,276 B1 *  11/2012  Callender ............... H04L 5/001
                                                    370/236

FOREIGN PATENT DOCUMENTS

CN    101938315 A    1/2011
WO    2011076283 A1  6/2011

OTHER PUBLICATIONS

Nokia Siemens Networks, "Use of Background Interference Matrix for Autonomous Component Carrier Selection for LTE-Advanced", 3GPP TSG RAN WG 1 #56 Meeting, Athens, Greece, Feb. 9-13, 2009.*

(Continued)

*Primary Examiner* — Jason Mattis
(74) *Attorney, Agent, or Firm* — David D. Brush; Westman, Champlin & Koehler, P.A.

(57) ABSTRACT

A method is provided to associate at least one user equipment to a plurality of component carriers. A carrier-to-interference ratio is calculated for each of component carriers available for the user equipment. Differences between the calculated carrier-to-interference ratios are calculated, with each difference being associated to a different one of the component carriers intervening in the difference, the component carriers being ordered in the decreasing order of their carrier frequency. The user equipment is associated with the component carrier having the lowest difference.

11 Claims, 2 Drawing Sheets

(51) Int. Cl.
*H04B 17/336* (2015.01)
*H04W 72/08* (2009.01)
*H04W 72/10* (2009.01)
*H04W 84/04* (2009.01)

(52) U.S. Cl.
CPC ............ *H04L 5/006* (2013.01); *H04L 5/0073* (2013.01); *H04W 72/082* (2013.01); *H04W 72/10* (2013.01); *H04W 84/042* (2013.01)

(56) References Cited

OTHER PUBLICATIONS

International Search Report and Written Opinion dated Jun. 7, 2013 for corresponding International Patent Application No. PCT/CN2012/082171, filed Sep. 27, 2012.

International Search Report and Written Opinion dated Jul. 8, 2014 for corresponding International Application No. PCT/IB2013/002530, filed Sep. 27, 2013.

Nokia Siemens Networks et al., "Use of Background Interference Matrix for Autonomous Component Carrier Selection for LTE-Advanced", 3GPP Draft; R1-090736 BIM, 3rd Generation Partnership Project (3GPP), Mobile Competence Centre; 650, Route Des Lucioles; F-06921 Sophia-Antipolis Cedex; France, No. Athens, Greece; Feb. 3, 2009, Feb. 3, 2009 (Feb. 3, 2009), XP050318600.

Fernando Sanchez-Moya et al., "On the Impact of Explicit Uplink Information on Autonomous Component Carrier Selection for LTE-A Femtocells", Vehicular Technology Conference (VTC Spring), 2011 IEEE, May 15, 2011 (May 15, 2011), pp. 1-5, XP031897037.

Luis G. U. Garcia et al., "Autonomous Component Carrier Selection for Local Area Uncoordinated Deployment of LTE-Advanced", Vehicular Technology Conference Fall (VTC 2009—Fall), 2009 IEEE 70th, IEEE, Piscataway, NJ, USA, Sep. 20, 2009 (Sep. 20, 2009), pp. 1-5, XP031600193.

Luis G. Uzeda Garcia et al., "Enhanced Uplink Carrier Aggregation for LTE-Advanced Femtocells", Vehicular Technology Conference (VTC Fall), 2011 IEEE, IEEE, Sep. 5, 2011 (Sep. 5, 2011), pp. 1-5, XP032029563.

Luis G. Uzeda Garcia et al., "Autonomous Component Carrier Selection: Interference Management in Local Area Environments for LTE-Advanced", IEEE Communications Magazine, IEEE Service Center, Piscataway, US, vol. 47, No. 9, Sep. 1, 2009 (Sep. 1, 2009), pp. 110-116, XP011283372.

\* cited by examiner

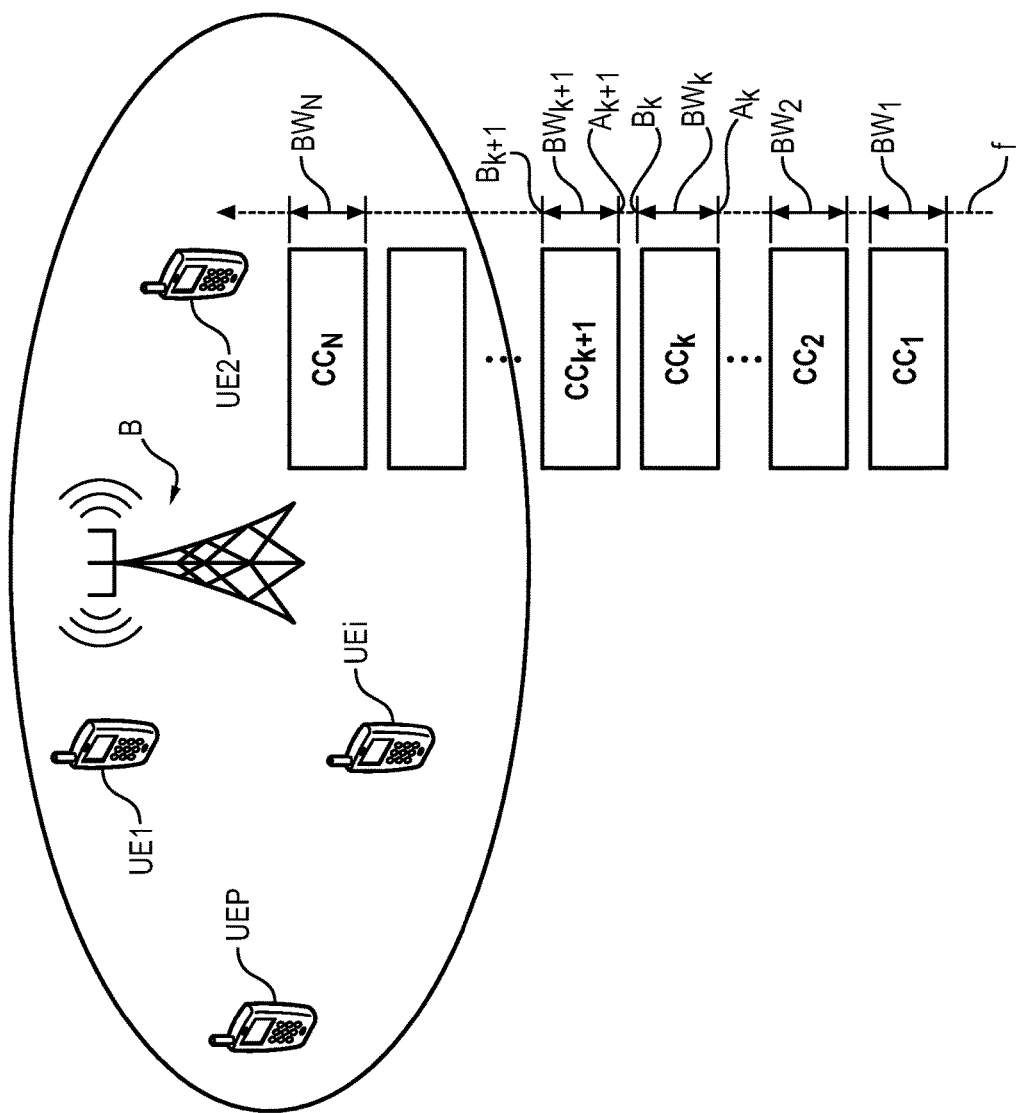

METHOD AND DEVICE TO ASSOCIATE AT LEAST ONE TELECOMMUNICATION USER EQUIPMENT TO COMPONENT CARRIERS

CROSS-REFERENCE TO RELATED APPLICATIONS

This Application is a Section 371 National Stage Application of International Application No. PCT/IB2013/002530, filed Sep. 27, 2013, the content of which is incorporated herein by reference in its entirety, and published as WO 2014/083396 on Jun. 5, 2014, in English.

FIELD OF THE INVENTION

The invention concerns a method and device to associate telecommunication at least one user equipment to component carriers.

One filed of the invention is wireless communication systems, and for example, Long Term Evolution (LTE) system as defined by the 3GPP (3rd Generation Partnership Project) with carrier aggregation techniques.

BACKGROUND OF THE INVENTION

One of the target searched by International Mobile Telecommunications (IMT)-Advanced system is the enhanced peak data rates to support advanced services and applications (100 Mbit/s for high mobility and 2 Gbit/s for low mobility were established as targets for research), as provided in [1] 3GPP TR 36.913 V8.0.0, "requirements for Further Advancements for E-UTRA (LTE-Advanced)", Release 8, June 2008. Therefore, the LTE-Advanced system requires wider system bandwidth, e.g. up to 100 MHz, to achieve such high target peak data rates.

Carrier aggregation (CA) is a known approach to defining new bandwidth modes in fulfilling this requirement. Carrier aggregation has the advantages of not requiring extensive changes to the LTE physical layer structure, providing for bandwidth scalabilty and maintaining backwards compatibility, as provided in [2] 3GPP TSG-RAN WG1 Meeting #53b, R1-082448, "Carrier aggregation in Advanced E-UTRA", Huawei and in [3] 3GPP TSG-RAN WG1 Meeting #53b, R1-082468, "Carrier aggregation in Advanced E-UTRA", Ericsson. In CA systems, multiple component carriers (CC) are aggregated to cover the desired LTE-Advanced system bandwidth. These component carriers are either LTE- Rel-8 compatible or are designed specially to support new LTE-Advanced features. An LTE Rel-8 terminal can transmit data one of these component carriers, while an LTE-Advanced terminal can simultaneously transmit data on multiple component carriers.

Two user equipments scheduling approaches in carrier aggregation system are studied in] 3GPP TSG-RAN WG1 Meeting #57, R1-091828, "System Simulation Results on Carrier Aggregation for Bursty Traffic", CMCC, namely independent carrier (IC) and carrier aggregation (CA).

In a first approach, known as independent carrier (IC), no change on the user equipments is required, i.e. the user equipments can receive data only on one of the carrier at a time and changing the carrier associated to the user equipment is a slow procedure. When a new user equipment attaches itself to a eNodeB (evolved Node B), the eNodeB assigns a suitable carrier to the new user equipment according to different criteria. The user equipment transmits data in the associated carrier frequency for a relatively long period of time until intra-frequency handover is performed.

One drawback of the IC approach is that it does not mention how to associate a user equipment to a component carrier. Furthermore, when large frequency gaps exist between the component carriers, the IC approach encounters difficulties in serving users equipment with optimal component carrier.

In a second approach, known as carrier aggregation (CA), a user equipment can simultaneously transmit on multiple carriers and no intra-frequency handover is required. The resource blocks which can be allocated on all the component carriers are allocated to the user equipments as a large resource pool. The user equipments can be scheduled to their best resources irrespective of whether or not these resources are within the same one or multiple component carriers(s).

One drawback of the CA approach is that is involves high scheduling complexity and requires multiple component carriers process ability on the user equipments side.

SUMMARY OF THE INVENTION

One of the goals of the invention is to improve the method and device to associate at least one telecommunication user equipment to component carriers.

According to an aspect of the invention, there is provided a method to associate at least one user equipment to a plurality of component carriers, characterized in that a carrier-to-interference ratios is calculated for each of component carriers available for the user equipment, differences between the calculated carrier-to-interference ratios are calculated, with each difference being associated to a different one of the component carriers intervening in said difference, the component carriers being ordered in the decreasing order of their carrier frequency, the user equipment is associated with the component carrier having the lowest difference.

Thanks to the invention, the throughput of the telecommunication user equipments is enhanced. The invention proposes a method to associate telecommunication user equipments to proper component carriers in a carrier aggregation system with multiple component carriers of different propagation characteristics. The larger the frequency gap between the carrier frequencies of the component carriers, the more gains the allocation according to the invention acquires. The invention provides higher throughput than randomly associated component carriers in the CA approach. The enhanced throughput is obtained by the invention for proportional fair (PF) scheduling, as well as for round robin (RR) scheduling.

According to an embodiment of the invention, there is a number m of telecommunication user equipments, whose bandwidths are included in a bandwidth of said component carrier.

According to an embodiment of the invention, m is proportional to the bandwidth of said component carrier divided by the sum of the required bandwidths of said telecommunication user equipments.

According to an embodiment of the invention, N being the number of carrier components, N−1 differences $D_{1,k}{}^i$ are calculated and associated to N−1 respective component carriers $CC_k$, which are other than the component carrier $CC_1$ of lowest carrier frequency, for k going from 2 to N, as follows:

$$D_{1,k}{}^i = CIR_1{}^i - CIR_k{}^i$$

wherein $CIR_1^i$ is the carrier-to-interference ratio of said component carrier $CC_1$ of lowest carrier frequency, wherein $CIR_k^i$ are the carrier-to-interference ratios of said N−1 respective component carriers $CC_k$ for k going from 2 to N and for each telecommunication user equipment UEi for i going from 1 to P, wherein P is the number of telecommunication user equipments in said plurality of telecommunication user equipments.

According to an embodiment of the invention, N−1 differences $D_{k-1,k}^i$ are calculated and associated to N−1 respective component carriers $CC_k$, which are other than the component carrier $CC_1$ of lowest carrier frequency, for k going from 2 to N, as follows:

$$D_{k-1,k}^i = CIR_{k-1}^i - CIR_k^i$$

wherein $CIR_k^i$ are the carrier-to-interference ratios of said N−1 respective component carriers $CC_k$ for k going from 2 to N and for each telecommunication user equipment UEi for i going from 1 to P, wherein P is the number of telecommunication user equipments in said plurality of telecommunication user equipments.

According to an embodiment of the invention, k in the N carrier-to-interference ratios is ordered for each i according to the ascending order of the carrier frequency of the N component carriers for each of the telecommunication user equipments transmitting respectively on the N component carriers.

According to an embodiment of the invention, the N carrier-to-interference ratios are ordered according to the ascending order of the carrier frequency of the N component carriers for each of the telecommunication user equipments transmitting respectively on the N component carriers.

According to an embodiment of the invention, if all the component carrier except the component carrier of lowest carrier frequency are associated to telecommunication user equipments and if it remains at least one unassociated telecommunication user equipment, said at least one remaining telecommunication user equipment is associated to the component carrier of lowest carrier frequency with a maximum of m telecommunication user equipment for said component carrier of lowest carrier frequency.

According to another aspect of the invention, there is provided a device to associate at least one user equipment to a plurality of component carriers, characterized in that the device comprises:

first means to calculate a carrier-to-interference ratios for each of component carriers available for the user equipment, second means to calculate differences between the calculated carrier-to-interference ratios, with each difference being associated to a different one of the component carriers intervening in said difference, means to associate, the user equipment with the component carrier having the lowest difference, the component carriers being ordered in the decreasing order of their carrier frequency.

BRIEF DESCRIPTION OF THE DRAWINGS

Other features and advantages of the method and device according to the invention will be clear from the reading of the description hereafter of a non-limiting example, with reference to the accompanying drawings, wherein:

FIG. 1 shows schematically a telecommunication user equipments and component carriers in a telecommunication environment, in which the method and device according to the invention are carried out, FIG. 2 shows an example of flow chart of the method according to the invention.

DETAILED DESCRIPTION OF THE INVENTION

Figure 3:
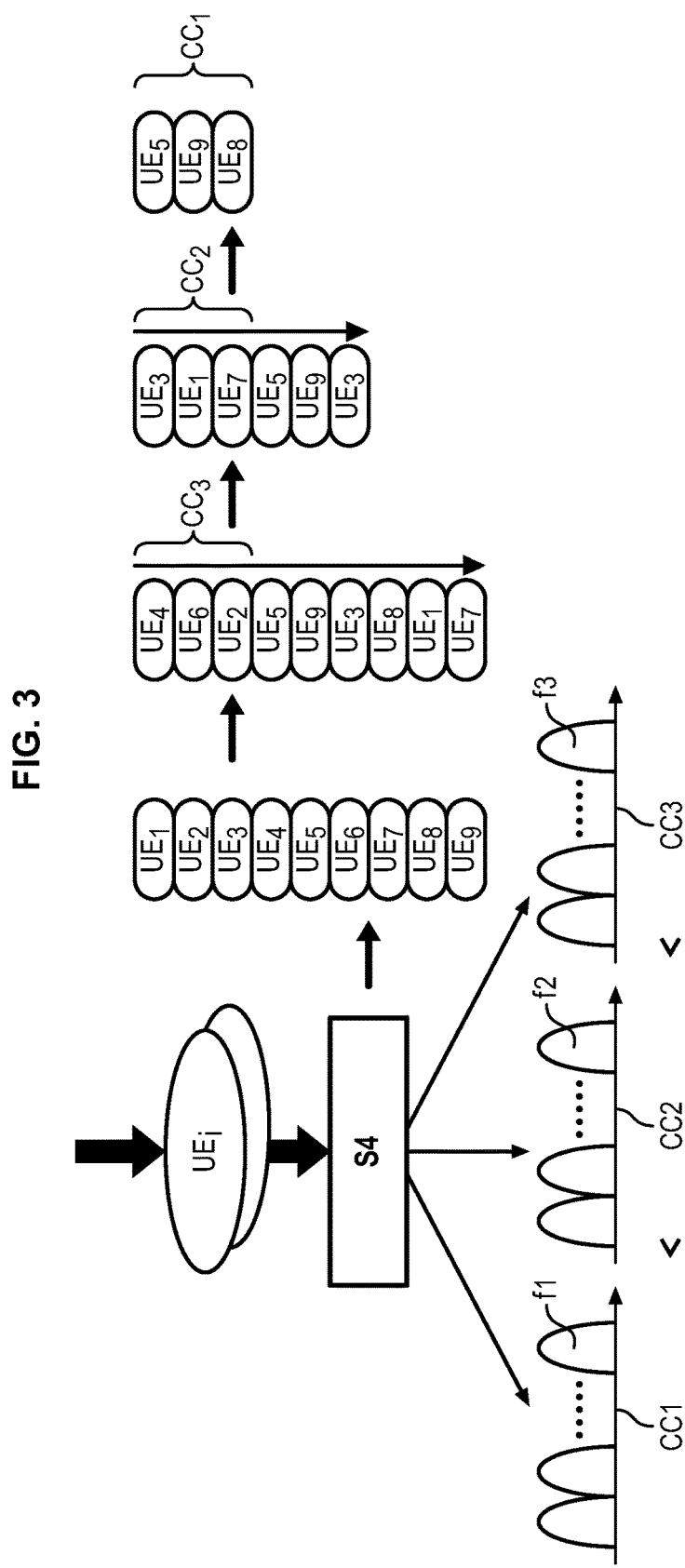
FIG. 3 shows an example of allocation according to the invention.

In FIG. 1, a plurality of telecommunication user equipments UEi, for example a number P of telecommunication user equipments UE1, UE2, . . . , UEi, . . . UEP is provided, with i being an integer going from 1 to P, and P being an integer with P≥2. A telecommunication user equipment is generally called user equipment UEi hereinafter, and indicia i in the following description designates a telecommunication user equipment. The telecommunication user equipment may comprise for example wireless terminals such as mobiles telephones or mobile equipments. Any user equipment UEi has his own frequency bandwidth $UEBW_i$ in which it transmits and receives signals. For example, the telecommunication user equipments UEi transmit and receive signals to and from a node B, which is also called E-UTRAN NodeB in the state in the art. Node B is the first node encountered for communication with the telecommunication user equipments UEi.

Also, a number N of component carriers $CC_1$, $CC_2$, . . . $CC_k$, . . . , $CC_N$, with k being an integer going from 1 to N, and N being an integer with N≥2, is provided. Each component carrier $CC_k$ has a frequency bandwidth $BW_k$ and a center frequency. The bandwidths $BW_k$ of each carrier component $CC_k$ are separated one from another, i.e. for example they cover each at least one carrier frequencies range having no common intersection range with the other bandwidths, or having only a carrier frequency limit in common with the other bandwidths. It is considered that the component carriers $CC_k$ may have propagation characteristics which may be different one from another. It is also considered that the component carriers $CC_k$ having similar propagation characteristics will be treated as one component carrier group. In the following, the term component carrier $CC_k$ designates both a component carrier $CC_k$ and a component carrier group and will be called component carrier $CC_k$. Consequently, in an embodiment, the bandwidth $BW_k$ of each component carrier $CC_k$ comprises at least one range of carrier frequencies. In an embodiment, the bandwidth $BW_k$ of each component carrier $CC_k$ comprises one range of carrier frequencies or several ranges of carrier frequencies, which are separated one from another.

For example, for k going from 1 to N, the bandwidths $BW_k$ cover carrier frequencies ranges ordered in the ascending order. For example, for k going from 1 to N−1, the bandwidth $BW_k$ covers a carrier frequencies range which is situated at lower carrier frequencies than the bandwidth $BW_{k+1}$.

For example, for k going from 1 to N, each bandwidth $BW_k$ is in a carrier frequencies range going from $A_k$ to $B_k$ with $A_1 < B_1 \leq A_2 < B_2 \leq \ldots \leq A_k < B_k \leq A_{k+1} < B_{k+1} \leq \ldots \leq A_N < B_N$ or with $A_1 < B_1 < A_2 < B_2 < \ldots < A_k < B_k < A_{k+1} < B_{k+1} < \ldots < A_N < B_N$, as shown for example on FIG. 1 showing the bandwidths depending on the frequency on the ascendant vertical axis f.

The method and device according to the invention are used for example in a carrier aggregation system.

According to the invention, there is provided a method to associate at least one user equipment UEi to a plurality of component carriers $CC_k$, a carrier-to-interference ratios $CIR_k^i$ is calculated for each of component carriers $CC_k$ available for the user equipment UEi, differences $D_k$ between the calculated carrier-to-interference ratios $CIR_k^i$ are calculated, with each difference $D_k$ being associated to a different one of the component carriers $CC_k$ intervening in said difference $D_k$, the component carriers $CC_k$ being ordered in the decreasing order of their carrier frequency, the user equipment UEi is associated with the component carrier $CC_k$ having the lowest difference $D_k$.

According to the invention, there is provided a device to associate at least one user equipment UEi to a plurality of component carriers $CC_k$, characterized in that the device comprises:

first means to calculate a carrier-to-interference ratios $CIR_k^i$ for each of component carriers $CC_k$ available for the user equipment UEi, second means to calculate differences $D_k$ between the calculated carrier-to-interference ratios $CIR_k^i$, with each difference $D_k$ being associated to a different one of the component carriers $CC_k$ intervening in said difference $D_k$, means to associate, the user equipment UEi with the component carrier $CC_k$ having the lowest difference $D_k$, the component carriers $CC_k$ being ordered in the decreasing order of their carrier frequency.

According to the carrier aggregation scheme, one or several bandwidth UEBWi of one or several telecommunication user equipment UEi is comprised in the signal communication bandwidth $BW_k$ of any one of the component carriers $CC_k$. Consequently, the bandwidth UEBWi of each telecommunication user equipment UEi is less wide than or as wide as the signal communication bandwidths $BW_k$ of each component carrier $CC_k$. The signal communication bandwidth $BW_k$ of any one of the component carriers $CC_k$ is used by the node B for communication (transmission and reception of signals as described above) with one or several telecommunication user equipment UEi. Consequently, signal communication bandwidth $BW_k$ can be divided into several bandwidth UEBWi of several telecommunication user equipment UEi, which is then called association of these telecommunication user equipment UEi to this component carrier $CC_k$.

A method and device to associate a plurality of P telecommunication user equipments UEi to N component carriers $CC_k$ according to an embodiment of the invention is explained hereunder in reference to FIG. 2.

In a first step S1, N carrier-to-interference ratios $CIR_k^i$ are calculated for each of the telecommunication user equipments UEi transmitting respectively on the N component carriers $CC_k$. The N carrier-to-interference ratios $CIR_k^i$ are calculated for each of the telecommunication user equipments UEi transmitting respectively on the N component carriers $CC_k$, for k going from 1 to N. Consequently, for i going from 1 to P and for k going from 1 to N, there are N·P carrier-to-interference ratios $CIR_k^i$ which are calculated.

For example, each telecommunication user equipment UEi calculates the N carrier-to-interference ratios $CIR_k^i$ for this telecommunication user equipment UEi transmitting respectively on the N component carriers $CC_k$. First means to calculate the N carrier-to-interference ratios $CIR_k^i$ for each of the telecommunication user equipments UEi transmitting respectively on the N component carriers $CC_k$ are embedded in each user equipment UEi and/or in the node B.

In an embodiment, the N carrier-to-interference ratios $CIR_k^i$ are ordered according to the ascending order of the carrier frequency of the N component carriers $CC_k$ for each of the telecommunication user equipments UEi transmitting respectively on the N component carriers $CC_k$.

For example, k in the N carrier-to-interference ratios $CIR_k^i$ is ordered for each i according to the ascending order of the carrier frequency of the N component carriers $CC_k$ for each of the telecommunication user equipments UEi transmitting respectively on the N component carriers $CC_k$.

Then, for example, the N carrier-to-interference ratios, $CIR_1^i, CIR_2^i, \ldots, CIR_k^i, CIR_{k+1}^i, \ldots, CIR_N^i$ correspond respectively to the order of $CC_1, CC_2, \ldots, CC_k, CC_{k+1}, \ldots, CC_N$, which correspond itself to the ascending order of $BW_1, BW_2, \ldots, BW_k, BW_{k+1}, \ldots, BW_N$ mentioned above.

For example, each user equipment UEi calculates on all the available component carriers $CC_k$ the carrier-to-interference ratios $CIR_k^i$ which depend on the location of the user equipment UEi, the pathloss model, shadow fading, penetration loss and so on.

In a second step S2, differences $D_k$ between the carrier-to-interference ratios $CIR_k^i$ of each telecommunication user equipment UEi are calculated. Each difference $D_k$ is associated to a different one of the component carriers $CC_k$ intervening in said difference $D_k$. Each difference $D_k$ depends also on the telecommunication user equipment UEi and then depends on i, which means that $D_k = D_k(i)$. Second means to calculate the differences $D_k$ between the carrier-to-interference ratios $CIR_k^i$ of each telecommunication user equipment UEi are provided, for example in the telecommunication user equipment UEi and/or in the node B.

The differences $D_k$ are then reported to the first node B.

In a first embodiment, the differences $D_k$ are calculated by subtracting one carrier-to-interference ratio from the other carrier-to-interference ratios.

For example, in the first embodiment, $D_k = D_{1,k}^i$ as described below:

$$D_{1,k}^i = CIR_1^i - CIR_k^i$$

wherein $CIR_1^i$ is the carrier-to-interference ratio of said component carrier $CC_1$ of lowest carrier frequency, wherein $CIR_k^i$ are the carrier-to-interference ratios of said N−1 respective component carriers $CC_k$, for k going from 2 to N and for each telecommunication user equipment UEi for i going from 1 to P.

Then, N−1 differences $D_{1,k}^i$ are calculated and associated to N−1 respective component carriers $CC_k$, which are other than the component carrier $CC_1$ of lowest carrier frequency, for k going from 2 to N.

In a second embodiment, the differences $D_k$ are calculated by subtracting the successive carrier-to-interference ratios successively one from another.

For example, in the second embodiment, $D_k = D_{k-1,k}^i$ as described below:

$$D_{k-1,k}^i = CIR_{k-1}^i - CIR_k^i$$

wherein $CIR_k^i$ are the carrier-to-interference ratios of said N−1 respective component carriers $CC_k$ for k going from 2 to N and for each telecommunication user equipment UEi for i going from 1 to P.

Then, N−1 differences $D_{k-1,k}^i$ are calculated and associated to N−1 respective component carriers $CC_k$, which are other than the component carrier CC, of lowest carrier frequency, for k going from 2 to N.

In a third step S3, it is determined that the bandwidth of each component carrier $CC_k$ is able to cover a number $m = m_k$ of telecommunication user equipments UEi. Consequently m depend on the component carrier $CC_k$ and on indicia k. The number $m_k$ of telecommunication user equipments UEi which each component carrier $CC_k$ is able to cover is calculated. Third means to determine the number m of telecommunication user equipments UEi that each component carrier $CC_k$ is able to cover, are provided for example in the node B and/or in the telecommunication user equipments UEi.

For example, $m=m_k$ is the number of telecommunication user equipments UEi, whose bandwidths UEBWi are separately included in the bandwidth $BW_k$ of said component carrier $CC_k$.

For example, $m=m_k$ is proportional to the bandwidth $BW_k$ of said component carrier $CC_k$ divided by the sum of the required bandwidths UEBWi of said telecommunication user equipments UEi.

The second step S2 can be carried out before the third step S3 as shown on FIG. 2, but could also be carried out after the third step S3 or at the same time as the third step S3.

It is not compulsory that the number m of telecommunication user equipments UEi that a component carrier $CC_k$ is able to cover, is strictly proportional to the bandwidth $BW_k$ of the component carrier $CC_k$.

In a fourth step S4, the component carriers $CC_k$ being ordered in the decreasing order of their carrier frequency, a number q of telecommunication user equipments UEi having the q lowest differences $D_k$ for each associated component carrier $CC_k$ are selected to be associated to said component carrier $CC_k$, with q≤m or q≤$m_k$. Then the fourth step is carried out in the decreasing order of the carrier frequency of the component carriers $CC_k$. The telecommunication user equipments UEi are sorted according to the differences $D_k$, in the ascending order of these differences $D_k$. Fourth means to select, for the component carriers $CC_k$ being ordered in the decreasing order of their carrier frequency, a number q of telecommunication user equipments UEi having the q lowest differences $D_k$ for each associated component carrier $CC_k$ with q≤m, in order to associate said selected telecommunication user equipments UEi to said associated component carrier $CC_k$, are provided, for example in the node B and/or in the telecommunication user equipments UEi.

Consequently, the association begins with the component carrier $CC_N$ having the highest carrier frequency (between $A_N$ and $B_N$). For the component carrier $CC_N$, q telecommunication user equipments UEi are selected and associated. For example, q≤$m_N$ for the component carrier $CC_N$. The q telecommunication user equipments UEi which are selected are the telecommunication user equipments UEi having the q lowest differences $D_N$, with k=N as described above.

Then the q telecommunication user equipments UEi associated to the component carrier $CC_N$ are no more considered for the other associations to the other component carriers.

Suppose the current component carrier to be associated is component carrier $CC_k$, all the telecommunication user equipments UEi which have not been associated to any component carrier are reordered according to the smallest differences $D_k=D_k(i)$, which means in the ascending order of the differences $D_k=D_k(i)$, with i being variable (except the already associated user equipments UEi) and k being constant for this current component carrier $CC_k$. It means that the smaller differences $D_k=D_k(i)$ come first.

If, for the current component carrier $CC_k$ of highest carrier frequency, the number of telecommunication user equipments UEi left to be associated is $u_k$, then the sorted differences $D_k=D_k(i)$ are differences $D_k=\{D_k(\pi1) \leq D_k(\pi2) \leq \ldots, \leq D_k(\pi u_k)\}$ with $D_k(\pi i) \leq D_k(\pi i+1)$, where πi is the user equipment index satisfying $1 \leq \pi i \leq u_k$, and $\pi i \neq \pi j$ when i≠j.

Then, in the first embodiment mentioned above, if, for the current component carrier $CC_k$ of highest carrier frequency, the number of telecommunication user equipments UEi left to be associated is $u_k$, then the sorted differences $D_k=D_k(i)=D_{1,k}^i$ are differences $D_k=\{D_{1,k}^{\pi1} \leq D_{1,k}^{\pi2} \leq \ldots, \leq D_{1,k}^{\pi u_k}\}$ with $D_{1,k}^{\pi i} \leq D_{1,k}^{\pi i+1}$, where πi is the user equipment index satisfying $1 \leq \pi i \leq u_k$, and $\pi i \neq \pi j$ when i≠j.

Then, in the second embodiment mentioned above, if, for the current component carrier $CC_k$ of highest carrier frequency, the number of telecommunication user equipments UEi left to be associated is $u_k$, then the sorted differences $D_k=D_k(i)=D_{k-1,k}^i$ are differences $D_k=\{D_{k-1,k}^{\pi1} \leq D_{k-1,k}^{\pi2} \leq \ldots, \leq D_{k-1,k}^{\pi u_k}\}$ with $D_{k-1,k}^{\pi i} \leq D_{k-1,k}^{\pi i+1}$, where πi is the user equipment index satisfying $1 \leq \pi i \leq u_k$, and $\pi i \neq \pi j$ when i≠j.

It is not compulsory that the number of telecommunication user equipments UEi that is associated to a component carrier $CC_k$ or to each component carrier $CC_k$, is strictly proportional to the bandwidth $BW_k$ of the component carrier $CC_k$, if it can't be satisfied.

In a fifth step S5, the q selected telecommunication user equipments UEi are associated to said component carrier $CC_k$ as mentioned above for the fourth step. If all the component carriers $CC_k$ except the component carrier $CC_1$ of lowest carrier frequency are associated to telecommunication user equipments UEi and if it remains at least one unassociated telecommunication user equipment UEi, said at least one remaining telecommunication user equipment UEi is associated to the component carrier $CC_1$ of lowest carrier frequency. The association is then completed and ends. If there is at least one component carrier $CC_k$ which is not associated, then step 4 is carried out again for this component carrier $CC_k$.

Steps S4 and S5 are carried out for example by the node B. Then node B divides the telecommunication user equipments UEi into groups, the number of which is equal to the number of component carriers $CC_k$ or to the number of groups $CC_k$ of component carriers. The telecommunication user equipments UEi will transmit and receive signals on the corresponding associated component carriers $CC_k$ for a period of time, for example as in the independent carrier scheme (IC).

FIG. 3 illustrates an example of the method of association according to the invention. For example, there are N=3 component carriers $CC_1$, $CC_2$ and $CC_3$ of different propagation characteristics, all with the same bandwidth $BW_1$, $BW_2$, $BW_3$. The component carrier $CC_1$ has a carrier frequency f1 lower than the carrier frequency f2 of component carrier $CC_2$, which itself has a carrier frequency f2 lower than the carrier frequency f3 of component carrier $CC_3$.

In the first step, the 3 carrier-to-interference ratios $CIR_1^i$, $CIR_2^i$, $CIR_3^i$ are calculated for each of the telecommunication user equipments UEi=UE1, UE2, UE3, UE4, UE5, UE6, UE7, UE8, UE9 transmitting respectively on the 3 component carriers $CC_1$, $CC_2$ and $CC_3$.

In the second step, the differences $D_{1,k}^i=CIR_1^i-CIR_k^i$ in the first embodiment are calculated, for k going from 1 to 3 (component carriers $CC_1$, $CC_2$ and $CC_3$) and for i going from 1 to 9.

In the third step, the number m=3 telecommunication user equipments UEi is determined for each of the component carriers $CC_1$, $CC_2$ and $CC_3$.

In the fourth step, for $CC_3$ having the highest carrier frequency, which means k=3, all the telecommunication user equipments UEi are sorted in the first embodiment in an ascending order of $D_{1,3}^i=CIR_1^i-CIR_3^i$ and the first m=3 first user equipments UEi are associated to $CC_3$, for example UE4, UE6 and UE2 as shown on FIG. 3, for which respectively $D_{1,3}^4 \leq D_{1,3}^6 \leq D_{1,3}^2$.

Then, for the next component carrier $CC_2$ having the highest carrier frequency, which means k=2, the left telecommunication user equipments UEi, except UE4, UE6 and UE2 which are associated to $CC_3$, are reordered in an ascending order of $D_{1,2}{}^i=CIR_1{}^i-CIR_2{}^i$ and the first m=3 first user equipments UEi are associated to $CC_2$, for example UE3, UE1 and UE7 as shown on FIG. 3, for which respectively $D_{1,3}{}^3 \leq D_{1,3}{}^1 \leq D_{1,3}{}^7$.

At last, some remaining telecommunication user equipments UEi, which are for example UE5, UE9 and UE8 are associated to component carriers $CC_1$.

In the invention, telecommunication user equipments that have higher carrier-to-interference ratio in low band than high band will get more reliable transmission in low band, so they will be associated to low component carrier, e.g. $CC_1$ in FIG. 3. And those with high carrier-to-interference ratio both in low band and high band will achieve similar result in either band, and therefore the allocation of them to the high band is reasonable. It is considered that fast fading is not considered in the allocation of user equipments.

It is also provided according to the invention a computer program comprising instructions for executing the method mentioned above, when said computer program is executed by a processor.

It is also provided according to the invention a non-transitory storage medium storing the computer program.

Although the present disclosure has been described with reference to one or more examples, workers skilled in the art will recognize that changes may be made in form and detail without departing from the scope of the disclosure and/or the appended claims.

The invention claimed is:

1. A method to associate at least one user equipment to a plurality of component carriers in a communication system, the method comprising:
the following acts performed by the user equipment or a node of the communications system:
calculating a carrier-to-interference ratio for each of the component carriers available for the user equipment,
calculating differences between the calculated carrier-to-interference ratios, wherein each difference corresponds to a difference in carrier-to-interference ratios between two different component carriers and is associated to a different one of the component carriers,
the component carriers being ordered in the decreasing order of their carrier frequency,
associating the user equipment with the component carrier associated with the lowest difference; and
transmitting to the node or receiving from the node, by the user equipment, data using the component carrier associated with the user equipment.

2. The method according to claim 1, wherein the at least one user equipment comprises a number m of telecommunication user equipment, whose bandwidths are included in a bandwidth of said component carrier having the lowest difference.

3. The method according to claim 2, wherein m is proportional to the bandwidth of said component carrier divided by the sum of required bandwidths of said telecommunication user equipment having the lowest difference.

4. The method according to claim 1, wherein, N being the number of carrier components ($CC_k$), N−1 differences $D_{1,k}{}^i$ are calculated and associated to N−1 respective component carriers $CC_k$, which are other than the component carrier $CC_1$ of the lowest carrier frequency, for k going from 2 to N, as follows:

$$D_{1,k}{}^i = CIR_1{}^i - CIR_k{}^i$$

wherein $CIR_1{}^i$ is the carrier-to-interference ratio of said component carrier $CC_1$ of lowest carrier frequency,
wherein $CIR_k{}^i$ are the carrier-to-interference ratios of said N−1 respective component carriers $CC_k$ for k going from 2 to N and for each telecommunication user equipment UEi for i going from 1 to P, wherein P is the number of telecommunication user equipment (UEi) in said plurality of telecommunication user equipment (UEi).

5. The method according to claim 3, wherein, N being the number of carrier components ($CC_k$), N−1 differences $D_{k-1,k}{}^i$ are calculated and associated to N−1 respective component carriers $CC_k$, which are other than the component carrier $CC_1$ of the lowest carrier frequency, for k going from 2 to N, as follows:

$$D_{k-1,k}{}^i = CIR_{k-1}{}^i - CIR_k{}^i$$

wherein $CIR_k{}^i$ are the carrier-to-interference ratios of said N−1 respective component carriers $CC_k$ for k going from 2 to N and for each telecommunication user equipment UEi for i going from 1 to P, wherein P is the number of telecommunication user equipment in said plurality of telecommunication user equipment.

6. The method according to claim 4, wherein k in the N carrier-to-interference ratios is ordered for each i according to the ascending order of the carrier frequency of the N component carriers for each of the telecommunication user equipments transmitting respectively on the N component carriers.

7. The method according to claim 1, wherein the N carrier-to-interference ratios are ordered according to the ascending order of the carrier frequency of the N component carriers for each of the telecommunication user equipments transmitting respectively on the N component carriers.

8. The method according to claim 1, wherein if all the component carriers except the component carrier of lowest carrier frequency are associated to telecommunication user equipments and if there remains at least one unassociated telecommunication user equipment, said at least one remaining telecommunication user equipment is associated to the component carrier of lowest carrier frequency with a maximum of m telecommunication user equipment for said component carrier of lowest carrier frequency.

9. The method according to claim 5, wherein k in the N carrier-to-interference ratios is ordered for each i according to the ascending order of the carrier frequency of the N component carriers for each of the telecommunication user equipments transmitting respectively on the N component carriers.

10. A device to associate user equipment to a plurality of component carriers in a communication system comprising a node, the device corresponding to one of the user equipment or the node,
wherein the device comprises:
first means for calculating carrier-to-interference ratios for each of the component carriers available for the user equipment,
second means for calculating differences between the calculated carrier-to-interference ratios, wherein each difference corresponds to a difference in carrier-to-interference ratios between two different component carriers and is associated to a different one of the component carriers,
means for associating the user equipment with the component carrier associated with the lowest difference, the component carriers being ordered in the decreasing order of their carrier frequency, and means for transmitting to or receiving from the other of the user equipment of the node, data using the component carrier having the lowest difference.

11. A non-transitory storage medium storing a computer program comprising instructions for executing a method to associate at least one user equipment to a plurality of component carriers, when said computer program is executed by a processor, the method comprising:

calculating a carrier-to-interference ratio for each of the component carriers available for the user equipment, calculating differences between the calculated carrier-to-interference ratios, wherein each difference corresponds to a difference in carrier-to-interference ratios between two different component carriers and is associated to a different one of the component carriers, the component carriers being ordered in the decreasing order of their carrier frequency, associating the user equipment with the component carrier associated with the lowest difference, and transmitting to the node or receiving from the node, by the user equipment, data using the component carrier having the lowest difference.

* * * * *